United States Patent
Fourney

(10) Patent No.: US 9,004,271 B2
(45) Date of Patent: Apr. 14, 2015

(54) WEIGHING SYSTEM USING A CONVEYOR BELT WITH LOAD CELLS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/239,744

(22) PCT Filed: Aug. 11, 2012

(86) PCT No.: PCT/US2012/050487
§ 371 (c)(1),
(2), (4) Date: Feb. 19, 2014

(87) PCT Pub. No.: WO2013/028378
PCT Pub. Date: Feb. 28, 2013

(65) Prior Publication Data
US 2014/0216894 A1 Aug. 7, 2014

Related U.S. Application Data

(60) Provisional application No. 61/527,293, filed on Aug. 25, 2011.

(51) Int. Cl.
*B65G 17/08* (2006.01)
*G01G 11/02* (2006.01)
*B65G 43/00* (2006.01)
*G01G 11/00* (2006.01)
*G01G 19/00* (2006.01)

(52) U.S. Cl.
CPC ........ *B65G 43/00* (2013.01); *B65G 2203/0258* (2013.01); *B65G 17/08* (2013.01); *G01G 11/02* (2013.01); *G01G 11/003* (2013.01); *G01G 19/002* (2013.01); *Y10S 198/959* (2013.01)

(58) Field of Classification Search
CPC ................... B65G 17/06; B65G 17/18; B65G 2203/0258; G01G 11/00; G01G 11/02; G01G 11/04; G01G 11/06
USPC ....................... 198/502.2, 959, 851
See application file for complete search history.

(56) References Cited

U.S. PATENT DOCUMENTS

| | | | | |
|---|---|---|---|---|
| 2,882,036 A | * | 4/1959 | Lyons | 177/16 |
| 3,478,830 A | * | 11/1969 | Haeflein et al. | 177/16 |
| 4,463,816 A | * | 8/1984 | MacFarlane | 177/119 |
| 5,689,092 A | * | 11/1997 | Wurz et al. | 177/145 |
| 6,323,452 B1 | | 11/2001 | Bonnet | |
| 6,964,550 B2 | * | 11/2005 | Hafner | 414/21 |
| 7,036,653 B2 | | 5/2006 | Reznik et al. | |
| 7,222,715 B2 | * | 5/2007 | Madden et al. | 198/370.04 |

(Continued)

FOREIGN PATENT DOCUMENTS

JP  2000249591 A  9/2000
WO  2010034388 A1  4/2010

*Primary Examiner* — Mark A Deuble
(74) *Attorney, Agent, or Firm* — James T. Cronvich

(57) ABSTRACT

A conveyor belt module, a conveyor belt, a weighing system, and a method for weighing articles conveyed on a conveyor belt. A conveyor belt includes an array of load cells embedded in belt modules to measure forces normal to the belt's conveying surface. The measurements are transmitted from the belt to a remote controller as part of a vision system that identifies individual articles conveyed on the belt and pressing down on underlying load cells. The vision system determines which load cells underlie the individual articles and combines their measurements to compute the weights of the articles on the fly.

19 Claims, 2 Drawing Sheets

(56) References Cited

U.S. PATENT DOCUMENTS

| | | |
|---|---|---|
| 7,635,060 B2 | 12/2009 | Lagneaux |
| 8,016,538 B2 * | 9/2011 | Monti .................. 414/222.13 |
| 8,397,904 B2 * | 3/2013 | Bogle .................... 198/810.04 |
| 8,746,435 B2 * | 6/2014 | Nijland .................. 198/370.04 |
| 8,841,565 B2 | 9/2014 | Herrmann et al. |

* cited by examiner

WEIGHING SYSTEM USING A CONVEYOR BELT WITH LOAD CELLS

BACKGROUND

The invention relates generally to power-driven conveyors and more particularly to conveyor systems having load cells embedded in the belt to weigh conveyed articles individually on the fly.

In some applications, individual articles have to be separately weighed while they are being transported on a conveyor belt. Conventional conveyor belt systems first singulate the conveyed articles so that they can be weighed sequentially at a weigh station the belt rides over. Singulating conveyor sections have to be inserted into the conveyor upstream of the weigh station to force the articles into a single file. Adding a singulating section to a conveyor system increases the length of the conveyor layout and reduces the usable width of the conveying surface.

SUMMARY

These shortcomings are addressed by a conveyor system embodying features of the invention. One version of such a conveyor system comprises a conveyor belt and a vision system. The conveyor belt has a two-dimensional array of load cells at individual positions in the belt. Each load cell measures a force normal to the belt's conveying surface at the load cell's individual position. The load cell produces a load-cell signal including measurements of the normal force at the load cell's position on the belt. Transmitters in the belt are each associated with one or more of the load cells and transmit the associated load-cell measurement from the belt. The vision system identifies each individual article conveyed on the belt's conveying surface and determines the individual load cells underlying the identified article.

In another aspect, a conveyor belt embodying features of the invention comprises a belt body with a conveying surface and a two-dimensional array of load cells at individual positions in the belt body. Each load cell makes a measurement of the force normal to the conveying surface caused by an article conveyed on the conveying surface at the load cell's individual position. Each load cell produces a load-cell signal representing the normal force. Transmitters in the belt are each associated with one or more of the load cells to transmit the load-cell signal of each of its associated load cells.

In another aspect, a method for weighing articles being conveyed by a conveyor belt embedded with an array of load cells comprises: (a) conveying articles on the conveying surface of the conveyor belt having an array of load cells making measurements of forces applied normal to the conveying surface; (b) identifying individual articles to determine which load cells underlie the individual articles; and (c) combining the measurements provided by the load cells underlying each individual article to determine its weight.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
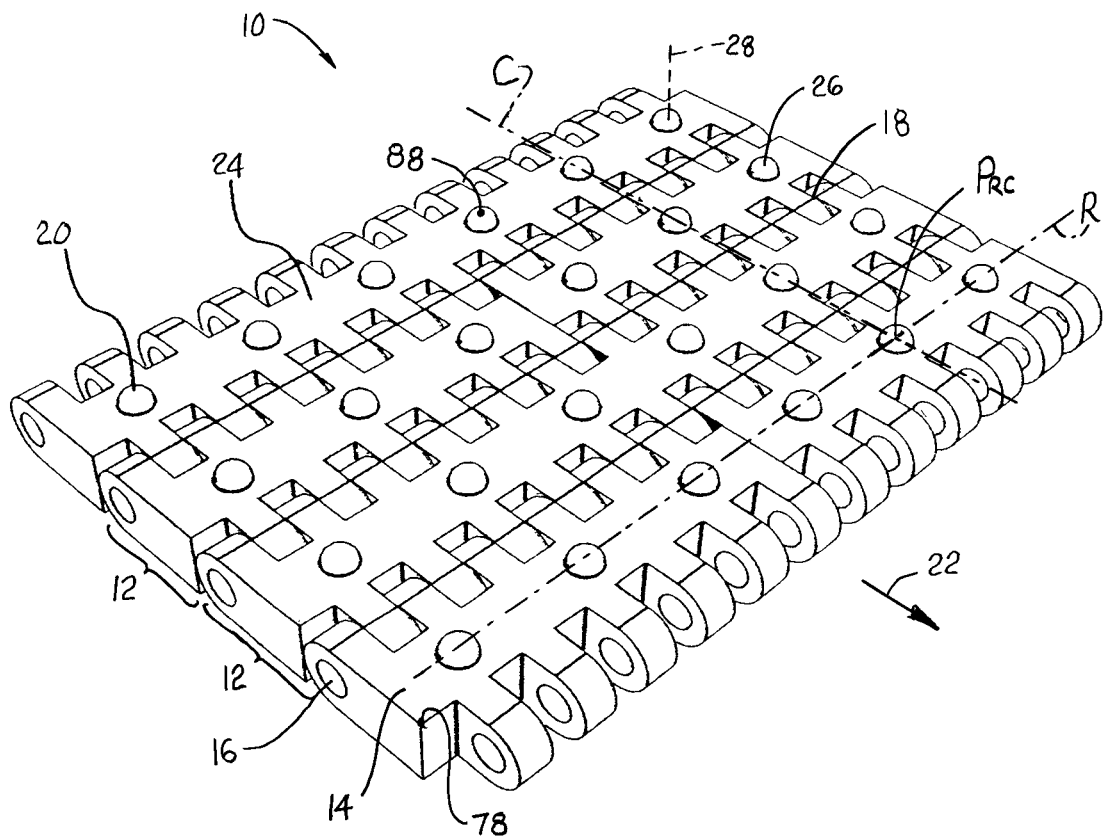
FIG. 1 is a perspective view of a portion of a conveyor belt embodying features of the invention.

One version of a portion of a conveyor belt embodying features of the invention is shown in FIG. 1. The conveyor belt 10 is a modular plastic conveyor belt constructed of a series of rows 12 of one or more plastic belt modules 14 hingedly connected end to end by hinge rods 16 or pins in interleaved hinge elements forming hinge joints 18 between consecutive rows. The belt modules 14 are conventionally injection-molded out of a thermoplastic polymer, such as polypropylene, polyethylene, acetal, or a composite polymer. Load cells 20 are embedded in the conveyor belt 10 at individual load-cell positions. Strain-gauge, piezoelectric, compression, resistive, or capacitive load cells, for example, may be used. In this version, the load cells are arranged in a two-dimensional array of rows R across the width of each belt row 12 and columns C along the length of the belt in a conveying direction 22. In this way, the position of any individual load cell 20 can be defined as $P_{RC}$, where R represents the load-cell row (or belt row if each belt row has only one row of load cells) and C represents the load-cell column from one side of the belt to the other. The density of the array or the separation between rows and columns of load cells for a given belt may be determined with a priori knowledge of the sizes and shapes of the conveyed articles. In this version, each load cell 20 is mounted at the outer conveying surface 24 of the belt 10. The load cells may be protected by a cover 26 that is domed to protrude slightly above the belt's conveying surface 24. The load cells have sensing axes 28 that are perpendicular, or normal, to the conveying surface 24 to measure forces applied normal to the conveying surface at the load cells' positions on the belt. But the load cells could be arranged to measure other force components as well, such as forces or components of forces parallel to the conveying surface of the belt.

Figure 2:
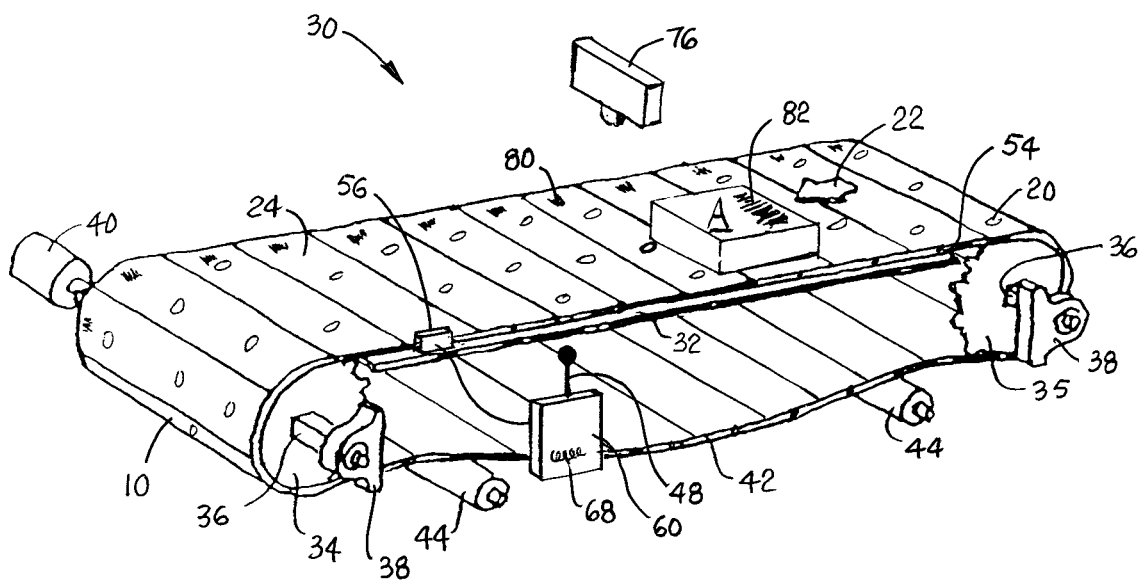
FIG. 2 is an isometric view of a conveyor system using a conveyor belt as in FIG. 1 and embodying further features of the invention.

The conveyor belt 10 is shown in a conveyor weighing system 30 in FIG. 2. The conveyor belt advances in the conveying direction 22 along an upper carryway 32. The endless belt is trained around drive and idle sprocket sets 34, 35 mounted on shafts 36, whose ends are supported in bearing blocks 38. A drive motor 40 coupled to the drive shaft rotates the drive sprockets 34, which engage the underside of the belt and drive the belt in the conveying direction 22 along the upper carryway 32. The belt returns along a lower returnway 42. Rollers 44 support the belt in the returnway and reduce the maximum catenary sag.

Figure 4:
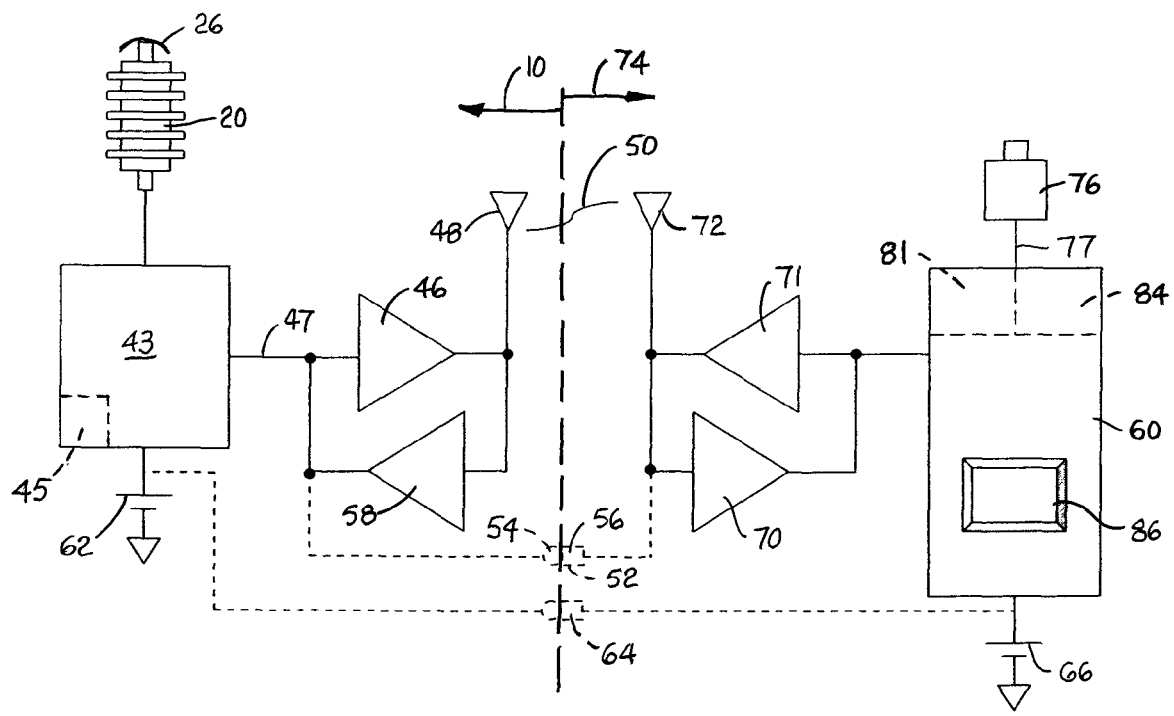
FIG. 4 is a block diagram of the electrical system of the conveyor system of FIG. 2.

As shown in FIG. 4, each load cell 20 is connected to a logic circuit 43 in the conveyor belt 10. Each logic circuit may be realized by a programmed microcontroller or by hardwired logic elements. Conventional signal-conditioning circuit components, such as buffers, amplifiers, analog-to-digital converters, and multiplexers, may be interposed between the load cell and the logic circuit. The logic circuit may include a unique address or other identification to identify the load cell. The address and the load cell's measurements may be stored in one or more memory elements 45. The load-cell measurements are embedded in a load-cell signal 47 that is transmitted remotely by a transmitter 46. The transmitter may be a wireless RF transmitter transmitting wirelessly via an antenna 48 over a wireless communication link 50 or over a sliding ohmic connection 52 between a conductive contact 54 on the outside of the belt 10 and a pickup 56 in conveyor structure along the side of the belt, as in FIG. 2. A receiver 58 may also be connected to the logic circuit to receive command and control signals from a remote controller 60, i.e., a controller not located on or in the conveyor belt. Other transmitter-receiver technologies, such as optical or infrared, for example, may be used. All the components embedded in the belt may be powered by a power supply 62, such as one or more battery cells, housed together in a cavity in the belt. Alternatively, the power supply 62 may be an energy harvester harvesting energy from vibratory motion or articulation of the conveyor, thermal gradients, or other energy-producing effects inherent in the process or conveyance. The embedded power supply 62 may alternatively be a capacitor charged over sliding contacts 64 from a remote power source 66, or by induction or by RF charging, as the embedded power supply recirculates past an external charging device 68, as in FIG. 2. To further conserve power, the transmitters can be operated at a low duty cycle, such as only once per belt cycle or only along the carryway or only when an article is atop the transmitter's associated load cell.

A remote receiver 70 receives the load-cell measurement signal 47 via an antenna 72 over the wireless communication link 50 or over the ohmic connection 52 from the transmitter 46 embedded in the conveyor belt. The remote receiver 70 sends the measurement signal to the remote controller 60. A transmitter 71 connected between the controller 60 and the antenna 72 or the ohmic connection 52 may be used to send command and control signals to the belt-borne load-cell circuits.

Figure 3:
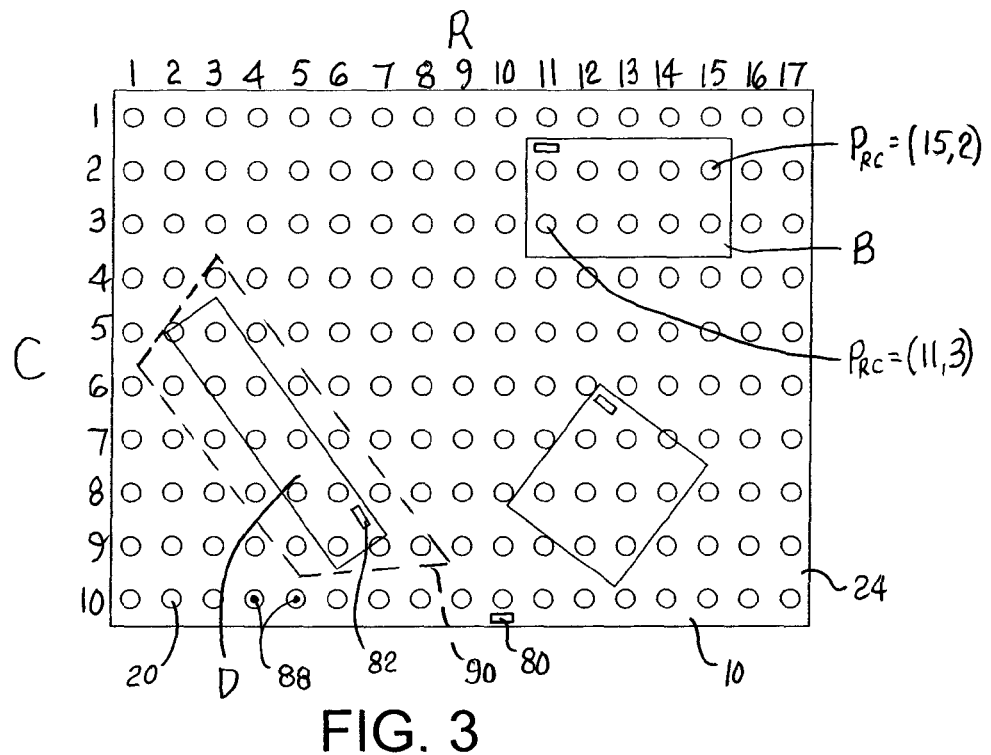
FIG. 3 is a top schematic of the conveyor system of FIG. 2.

The remote controller 60 is part of a vision system 74 used to identify an individual conveyed article and determine which load cells underlie it. The vision system includes a camera 76 or other optical detector supported above the carryway 32 to vision a portion of the conveying surface. Optical signals 77 from the camera are sent to the controller 60. The controller executes a pattern-recognition process to determine the footprints of individual articles conveyed on the belt from the optical signals. With a priori knowledge of the load-cell-array geometry relative to a point on the belt, such as a belt-module corner 78 (FIG. 1), the vision system can determine relatively a group of load cells under an individual article's footprint. For example, in the portion of conveying surface 24 as shown in FIG. 3, article B overlies ten load cells covering two columns C and five rows R. Optically detectable markers 80 on some or all belt rows, for example, may be used by the vision system to identify absolutely which ten load cells are covered by article B. In this example, the vision system reads the marker, which may be coded or simply the number 10 indicating that it is on row 10 of the belt. With the a priori knowledge of the array geometry and the footprint of article B with respect to row 10, the vision system can identify the ten load cells underlying the article. The vision system can then execute a weighing process 81 that combines the measurements of the load cells at absolute positions $P_{RC}=\{(R, C)\}=\{(11, 2); (11, 3); (12, 2); (12, 3); (13, 2); (13, 3); (14, 2); (14, 3); (15, 2); (15, 3)\}$ to compute the weight of article B. The load-cell measurements may be combined, for example, by summing the individual load-cell measurements to compute a value equal or proportional to the weight of the underlying article. Each of the articles is marked with identifying indicia 82, such as a bar code, that a reader 84 (FIG. 4) in the vision system can interpret. In that way, the computed weight can be associated with a specific individual article. And, because the vision system visions the entire width of the belt, articles do not have to be arranged in a single file over a static weighing station in the carryway. Furthermore, the load-cell array in the belt allows the weight to be measured without stopping the belt. A video display 86 of the vision system 74 may be used to monitor system operating conditions and settings or the weights of individual articles. The controller 60 may be a programmable logic controller, a laptop, a desktop, or any appropriate computer device capable of executing the processes described.

The vision system could use other means to assign weights to individual articles. For example, the positions of each of the load cells could be marked on the conveying surface 24 or the load-cell covers 26. The mark could identify each load cell explicitly or could just be a generic position mark, such as a dot 88 (FIGS. 1 and 3) on each or a predetermined subset of the load cells. If all the load-cell positions are marked, the vision system would not need a priori knowledge of the array layout. As another example, the vision system could alternatively select all those load cells in an enlarged region 90 (FIG. 3) about the article footprint and sum their measurements. The load cells not under the article D would have measurement values of zero, which would not add to the weight. This ensures that the entire article is weighed accurately. If, of course, another article is close by, the enlarged region has to be carefully selected so as not to encompass the nearby article.

If the articles are separated enough so that no two articles are atop the same or adjacent load cells, the weight of each article can be determined by summing the load-cell measurements of contiguous, non-zero-reading load cells.

Although the weighing system has been described in detail with reference to a few versions, other versions are possible. For example, the conveyor belt need not be a modular plastic conveyor belt. It could be a flat belt or a slat conveyor, for instance. As another example, visioning algorithms and detectable markers on the belt other than those described could be used by the vision system to identify individual articles and the load cells underlying them. Furthermore, there could be one transmitter in each belt module associated with all the load cells in the module, one transmitter associated with each load cell, or a few transmitters in each module associated with more than one load cell. So, as these few examples suggest, the scope of the claims is not meant to be limited to the details of the exemplary versions.

What is claimed is:

1. A conveyor belt comprising:
   a belt body having a conveying surface;
   a plurality of load cells disposed at individual positions in the belt body to form a two-dimensional array of load cells, each load cell making a measurement of the force normal to the conveying surface caused by an article conveyed on the conveying surface at the load cell's individual position and producing a load-cell signal representing the force;
   a detectable marker on the belt body in predetermined spatial relationship to the array of load cells;
   a plurality of transmitters in the belt body, each transmitter associated with one or more of the load cells to transmit the load-cell signal of each of the associated load cells.

2. A conveyor belt as in claim 1 further comprising a plurality of antennas in the belt body connected to the plurality of transmitters to transmit the load-cell signals wirelessly.

3. A conveyor belt as in claim 1 further comprising a plurality of contacts on the belt body connected to the plurality of transmitter to transmit the load-cell signals ohmically.

4. A conveyor belt as in claim 1 further comprising a plurality of power supplies connected to one or more of the load cells to power the one or more connected load cells.

5. A conveyor belt as in claim 1 wherein the belt body includes a series of rows of one or more conveyor belt modules hingedly linked together end to end at hinge joints between consecutive rows.

6. A conveyor system comprising:
   a conveyor belt having:
      a conveying surface;
      a two-dimensional array of load cells disposed at individual positions to form a two-dimensional array of load cells, each load cell measuring a force normal to the conveying surface at the load cell's individual position and producing a load-cell signal including measurements of the force normal to the conveying surface at the load cell's individual position; and
      a plurality of transmitters, each transmitter associated with one or more of the load cells to transmit the associated load-cell measurements from the conveyor belt;
   a vision system identifying each individual article conveyed on the conveying surface and determining the individual load cells underlying the article.

7. A conveyor system as in claim 6 wherein the vision system includes a receiver receiving the load-cell measurements transmitted by the transmitters and combines the load-cell measurements of the load cells underlying an identified individual conveyed article to determine the weight of the article.

8. A conveyor system as in claim 7 wherein the vision system combines the load-cell measurements by summing the load-cell measurements of the load cells underlying an identified individual conveyed article to determine the weight of the article.

9. A conveyor system as in claim 6 wherein the conveyed articles include identification indicia and the vision system includes a reader to read the identification indicia.

10. A conveyor system as in claim 6 wherein the transmitters are wireless transmitters.

11. A conveyor system as in claim 6 further comprising contacts on the conveyor belt connected to the transmitters and pickups proximate the belt in a position to make an electrical connection with the contacts as the conveyor belt passes the position of the pickups to conduct the load-cell measurements from the transmitters to the vision system.

12. A conveyor system as in claim 11 further comprising a power supply connected to the pickups to supply power to the load cells and the transmitters via the contacts.

13. A conveyor system as in claim 6 wherein the conveyor belt further includes embedded power supplies supplying power to the load cells and transmitters.

14. A conveyor system as in claim 6 wherein the conveyor belt includes a series of rows of one or more conveyor belt modules hingedly linked together end to end at hinge joints between consecutive rows.

15. A method for weighing articles being conveyed by a conveyor belt embedded with an array of load cells, the method comprising:
   conveying articles on the conveying surface of a conveyor belt having a two-dimensional array of load cells making measurements of forces applied normal to the conveying surface;
   identifying individual articles to determine which load cells underlie the individual articles;
   combining the measurements provided by the load cells underlying each individual article to determine the weight of each individual article.

16. The method of claim 15 comprising combining the measurements by summing the measurements provided by the load cells underlying each individual article.

17. The method of claim 15 comprising visioning the conveying surface of the conveyor belt to identify individual articles.

18. The method of claim 15 comprising identifying individual articles by reading a code on the articles.

19. The method of claim 15 comprising combining the measurements of contiguous load cells having non-zero measurements.

* * * * *